F. KEIPER.
INTERLOCKING MECHANISM.
APPLICATION FILED FEB. 25, 1904.
1,031,184.
Patented July 2, 1912.
3 SHEETS—SHEET 1.
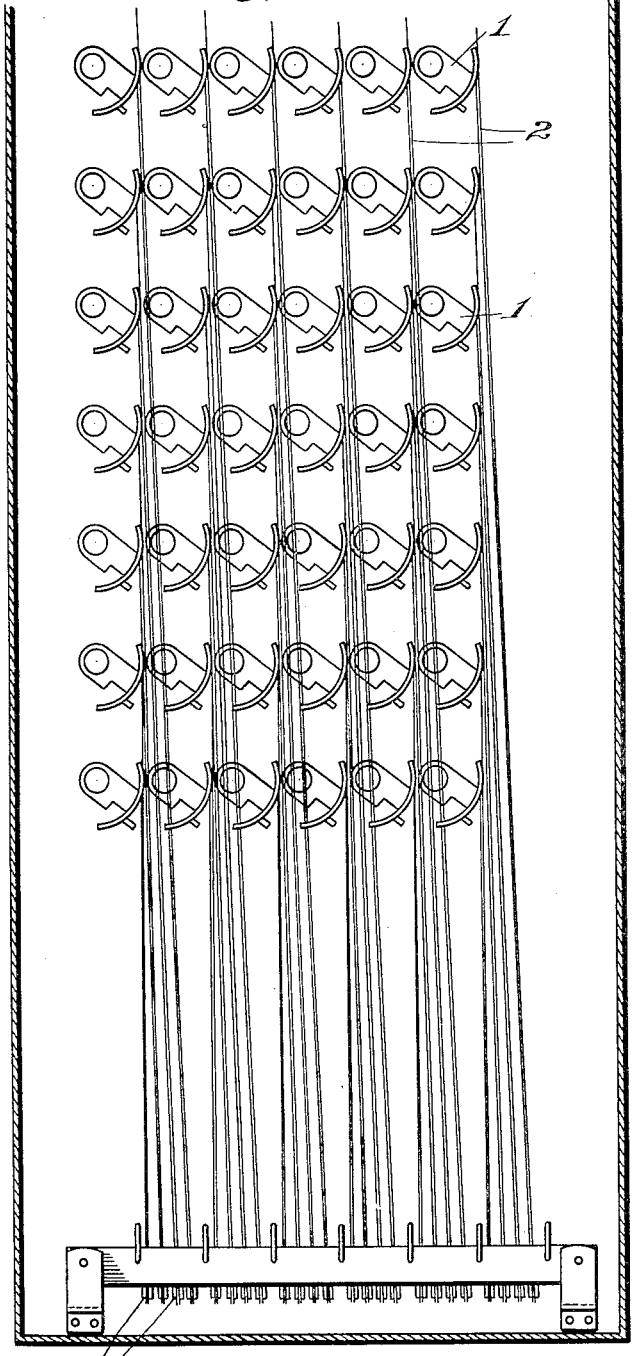
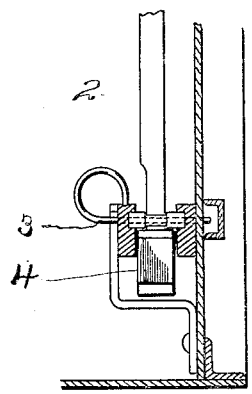
WITNESSES:
INVENTOR.
Frank Keiper,
BY
Wilkinson & Fisher.
ATTORNEYS.

F. KEIPER.
INTERLOCKING MECHANISM.
APPLICATION FILED FEB. 25, 1904.
1,031,184.
Patented July 2, 1912.
3 SHEETS—SHEET 2.
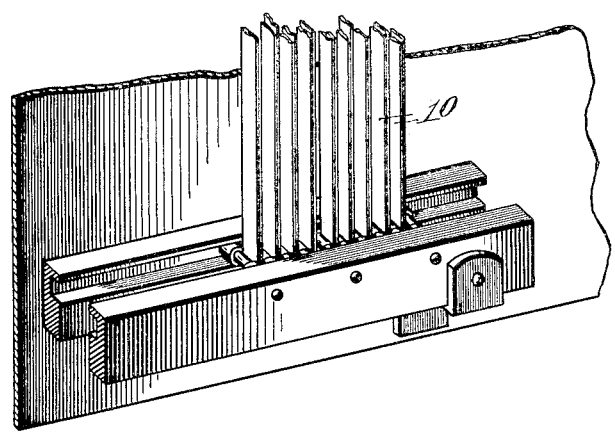
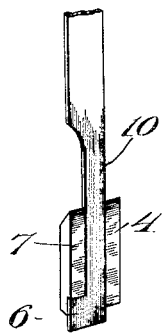
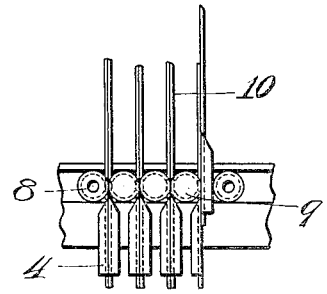
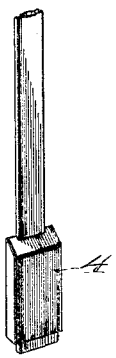
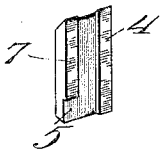

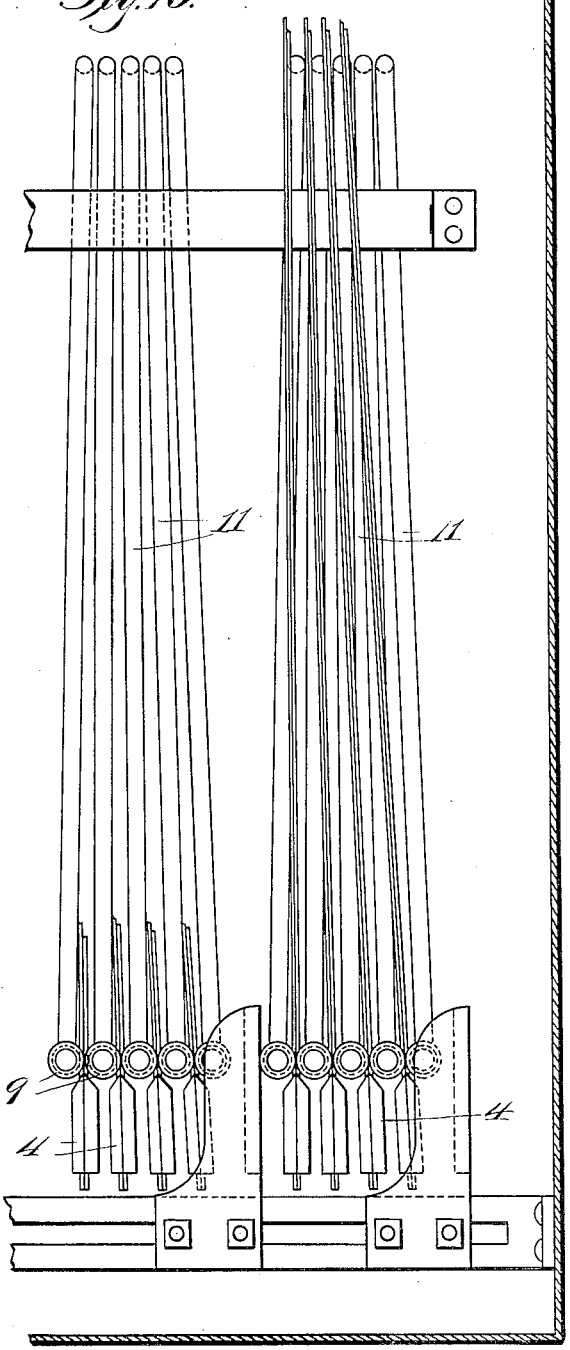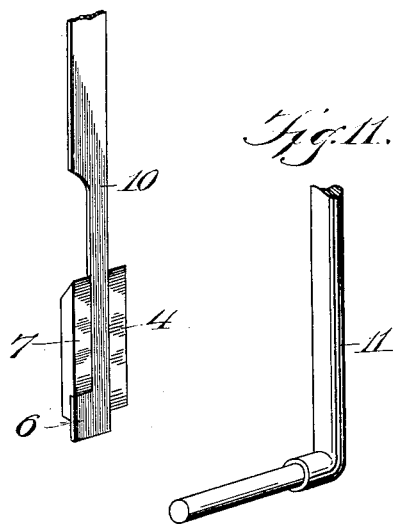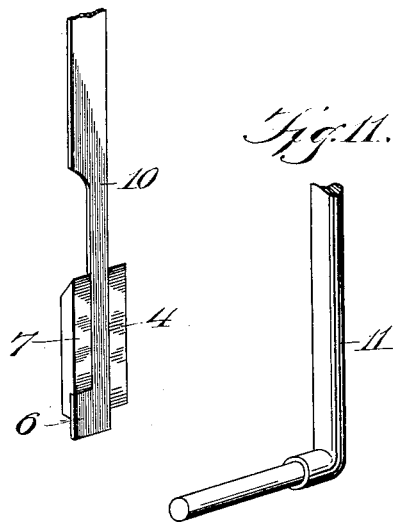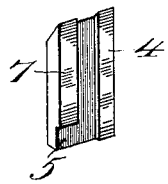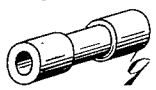

UNITED STATES PATENT OFFICE.

FRANK KEIPER, OF ROCHESTER, NEW YORK, ASSIGNOR TO EMPIRE VOTING MACHINE CO., OF ROCHESTER AND JAMESTOWN, NEW YORK, A CORPORATION OF NEW YORK.

INTERLOCKING MECHANISM.

1,031,184.  Specification of Letters Patent.  Patented July 2, 1912.

Application filed February 25, 1904. Serial No. 195,265.

*To all whom it may concern:*

Be it known that I, FRANK KEIPER, a citizen of the United States, residing at Rochester, in the county of Monroe and State of New York, have invented certain new and useful Improvements in Interlocking Mechanism; and I do hereby declare the following to be a full, clear, and exact description of the invention, such as will enable others skilled in the art to which it appertains to make and use the same.

Reference is had to the accompanying drawings, forming a part of this specification, and to the reference numerals marked thereon.

My present invention relates to an improvement in the interlocking system, of the type described in one of my pending applications, which has for its purpose the simplifying of the interlocking system, and increasing its flexibility and accuracy.

The invention further consists in the details, by which these improvements are obtained, the patentable features being pointed out in the claims at the end of this specification.

In the drawings, Figure 1 represents a part of the keyboard of a voting machine, shown in rear view, showing the rear portion of the keys and the interlocking straps and wedges connected thereto. Fig. 2 shows a cross section of the interlocking channel, with the wedges and interlocking rollers in position. Fig. 3 is a perspective view of the interlocking straps and rollers, and channel supporting said rollers. Fig. 4 is a detail of the wedge, showing the connection between it and the interlocking strap. Fig. 5 is a detail of the wedge, showing how it is made for the purpose of connecting it to the strap. Fig. 6 is a front view of the wedge connected to its interlocking strap. Figs. 7 and 8 are views of the preferred form of interlocking block, which I use, which in this case is a roller recessed in the middle, the recess having a width a little larger than the width of the interlocking strap, the roller in Fig. 7 being pierced for the pin block marking the ends of the single candidate groups. Fig. 9 shows the wedges and rollers and channel assembled, the details being shown on a large size. Fig. 10 shows the application of this interlock to an interlocking system, in which the channel is replaced by supporting the rollers individually, each on a swinging support. Fig. 11 is a detail of such swinging support, and Figs. 12, 13, and 14 are details showing the same wedge and interlocking block or roller, adapted for use with it.

Similar reference numerals in the different figures indicate similar parts.

The parts herein described have been illustrated preferably in connection with the parts of a voting machine such as are described in the patent to Gillespie, for example, 647,657, patented April 17, 1900, and may be used in connection with that kind of a machine, either of the vertical type or of the horizontal type, or any of the voting machines patterned thereafter, although it is obvious that the invention is also adapted to any other form of voting machine to which this method of interlocking might be applicable.

In Fig. 1, the parts marked 1 represent the voting keys. 2 refers to the interlocking strap, to the end of which is connected the wedge 4. This strap is of a given width at some distance above the interlocking wedge, for the purpose of perforating it to permit the resetting bar to pass through it. The width, however, is reduced where it connects to the interlocking wedge, and at this point the strap is intended to be as strong as it is at the weakest point above it although it could be narrower or wider without interfering with the principle of my invention.

The wedge itself is shown in Figs. 5 and 13, and is referred to by the reference numeral 4. The back of it is recessed a little more than the thickness of the strap, so that the strap itself will lie below the surface of the back of the wedge, not coming flush with it by a few thousandths of an inch. The recess of the wedge 4 is cut out at right angles at the place marked 5, so that the strap which is cut to correspond at 6, will come directly in contact with the abutment on the wedge marked 7, and will tend to lift it positively when the strap itself is raised, the strap and wedge being formed preferably by forcing the strap into the recess, drawing the projection 6 tight against the abutment 7, and then brazing or soldering the strap and wedge together.

These wedges are arranged between the interlocking blocks back to back, the straps connecting said wedges to their keys not being allowed to contact with the interlocking surfaces of the blocks or rollers with which they interlock. These blocks are arranged in the channel, and are such as are illustrated in Figs. 7 and 8, and are herein referred to by the reference numerals 8 and 9, 8 referring to the pin block and 9 to the intermediate blocks.

3 represents one of the pins adapted to confine any one of the rollers against lateral movement.

The block, or roller, which latter term is more descriptive of its form, is a cylinder, from the central portion of which a part of the metal is cut, so as to give it approximately the form of a small dumb-bell, so to speak, the recesses being cut away to a width a little in excess of the width of the interlocking strap at the part marked 10 in Fig. 4, which is the part of the interlocking strap that passes immediately between the rollers.

The recess of the roller is in each case cut out to a depth approximately from 1 to 3 hundredths of an inch in excess of the thickness of the strap. This permits the rollers themselves to come directly in abutment with each other, as long as the wedges themselves are not in voted position, and although the straps lie between the rollers, the combined thickness of the two straps is not sufficient to keep the rollers apart, but it will be found with such an arrangement, that when the rollers are in abutment, the two straps have a play or freedom of motion between the rollers of several hundredths of an inch.

On the end of the roller, a portion of the thick part engages with the interlocking channel, such as is shown in cross section in Fig. 2. Practically all of the balance of the thick part of the roller that is exposed is engaged by the wedges 4, which are placed on either side of it, the wedge being made broad enough so as to extend clear across the channel to prevent any serious side motion being given to it, and to guide the strap connected thereto, so that it will not get out of the recess between the rollers.

As pictured in Fig. 4, the wedge is considerably wider than the strap at the part marked 10, and the part on either side of the strap is the part of the wedge which will engage with the thick parts of the interlocking roller 8, and the interlock is established between the sides of the wedge and the thick part of the roller, as above described.

It has been found by experiment that the rollers described herein are preferable to the square blocks described in my previous application for several reasons. They are more easily made, and being round the point of contact between consecutive rollers is reduced to a line, so that the surfaces come more readily into intimate contact, and admit of very much less compression after normal contact than do the wedges and blocks where the blocks present flat surfaces to the wedges and their interlocking rods and straps.

In my previous application, the interlock is described with reference to reducing the number of joints in the interlocking train, which results in a corresponding increase in the rigidity of the train, making it more accurate in its performance. The present improvement carries out this idea still further by reducing the amount of surface contact between consecutive parts of the interlocking train, and adapting the form of the interlocking block to secure this result.

I am aware that rollers have been used before in connection with the interlocking mechanism of voting machines, but a roller recessed as herein described, and for the purposes used in connection with the wedges also described, is believed to be new and patentable.

It is obvious that the interlocking wedge can be shaped to contact with the roller on one side of the strap only, and not on both sides of the strap, as illustrated and described herein. The roller may be so formed that the thick part on one side may lie wholly within the channel on that side, in which case, the wedge may be shaped to interlock on one side only, but it is deemed preferable to contact with the rollers on both sides of the strap, as the strain by which the wedge is pulled to voted position remains central, and there is no tendency for the wedge to swerve away from its interlocking contact. The roller may be formed with a central thick part with recesses on either side through which openings the connection may pass to connect with the wedge below, the form of which wedge with its connection is described in my previous application.

A further improvement in this interlock has been made as follows: The pinhole through the rollers that mark the ends of the single candidate groups are made unnecessarily large by several thousandths of an inch, allowing the roller that much independent motion to the right or left along the channel when the pin is in position to fasten it in place. It frequently happens that the pinholes through the channel are drilled out of place by a few thousandths of an inch, and the rollers would have to be made smaller on one side of the pin so much out of place and larger on the other side. By drilling the pin hole through the roller unnecessarily large the rollers can all be of practically uniform diameter, and the pin roller will then accommodate itself to that extent to the irregularities in the spacing of the holes, and will also compensate for too much friction in one single candidate group and not enough in an adjacent group, thus making parts of the single candidate groups work as easy when separated as they would work when combined into multi-candidate group, when the lost motion of the whole group would be in common to adjust itself where it would be the most needed. If desired, the pin hole can be made large through the channel and snug through the roller, and large through both channel and roller. Another result secured by these rollers is that they move along the channel with comparatively little resistance or friction. If a wedge be withdrawn at one end of a large group and another inserted in its stead at the other end of the group, the rollers are easily moved to close up the space at one end to make room for the wedge at the other end.

By making the parts according to the invention herein described, the size of the various parts may be so adjusted that there will be little or no lost motion under normal conditions when a straight ticket is voted in a group of large size, say twenty or thirty single candidate groups thrown into one. The perceptible lost motion under normal conditions will be a very small fraction of the thickness or displacement of an interlocking wedge which in the experiments referred to was one tenth of an inch, and the lost motion or compression that may be developed by forcing an extra wedge will be but a small fraction of the thickness of a wedge, so that, the lost motion under normal conditions plus the lost motion that may be developed by excessive compression will be very much below the thickness of a wedge and will correspondingly protect the accuracy and integrity of the interlocking and grouping mechanism.

In previous interlocking systems, it has been found that in order to avoid excessive friction in the voting of a key in a single candidate group or in the voting of the last key in a multi-candidate group, a liberal allowance of lost motion must be made, and while this lost motion may not be apparent under normal conditions it is readily developed when excessive pressure is applied to force an extra key, and is also readily ascertained when the parts composing the interlocking train are measured with a micrometer and the combined measurements thus obtained are subtracted from the distance between the extreme ends of the group.

If the friction on the last key voted exceeds normal, it interferes with the operation of it, making it more difficult to operate and making it more probable that the efforts of some voters to vote the last key of the group will be completely defeated. If to minimize the friction, the parts are fitted loosely, the lost motion under compression becomes so great that an extra wedge can be forced in a comparatively small group, say five or six, and this trouble can only be partially corrected by the use of compensators; for friction on the one hand must always be guarded against and this will always leave sufficient lost motion, so that the extra wedge can be forced in a group of moderate size.

Arranging the parts as above described overcomes these difficulties and increases the grouping capacity of the interlocking system. It also permits a reduction in the thickness of the wedge without interfering with the accuracy of the interlock for large groups and the thinner wedge in turn makes it possible to vote a larger number of keys at either end of the group than would be possible otherwise. This capability of the interlock may be termed its flexibility. A group of twenty-five has been accurately interlocked and the whole number of twenty-five keys have been voted at either end of the group with the same effect on the interlock as if they were voted as a straight ticket, and the experiment showed at the same time that a group of fifty or even more was easily possible. In Fig. 10, I have illustrated these same rollers, mounted on swinging supports 11, by the use of which a channel becomes unnecessary in connection with the interlocking rollers. It is also apparent that by placing the wedges back to back so that only half of the number of rollers is used, the rollers themselves are practically doubled in size, as are also the rods 11 which support them making them very much stiffer and stronger and increasing the strength, accuracy and rigidity of the interlocking system to a very marked extent, these results being secured without increasing the distance between centers of the keys thus interlocked.

The wires or rods supporting the rollers in Fig. 10 may be of any preferred form adapted to the convenience or the necessity of the construction of the machine, and suitable forms for that purpose are illustrated in detail in Figs. 11 and 14, it being understood that many variations from these details may be made without departing from the spirit of my invention; it also being understood that the rollers may be separated in the groups by any preferred means, it not being deemed material whether the separation is made by a pin passing through the dividing roller, or whether the separation is made by holding the dividing roller in place by a recessed finger fitting down over it, or by the device illustrated in Fig. 10, or by any other preferred means.

It is evident that by the removal or insertion of the pins 3 the whole interlocking mechanism may be thrown into a single group, or sub-divided into as many groups, of various sizes, as may be desired.

The operation is as follows: When a key is operated by a voter, one of the straps 2 is pulled up, drawing the corresponding wedge between the rollers 4. This, in a single-candidate group, prevents further voting in that group, until after the machine is reset, since no further motion between the rollers is permitter, so that a second wedge cannot be pulled up between the rollers. In a multi-candidate group, this limiting action occurs when the predetermined number of keys has been voted. After a voter has finished voting, the machine is reset by suitable mechanism (not shown) such as described, for example, in the Gillespie patent above referred to.

Having thus fully described my invention, what I claim as new is as follows:

1. A cylindrical interlocking roller having an annular recess located centrally thereof.

2. An interlocking roller made up of a cylinder of one diameter joining two cylinders of larger diameter.

3. The combination of an interlocking roller and a fastening therefor, said roller being so connected to its fastening as to permit a limited movement thereon.

4. In interlocking mechanism, a movable abutment, a pin passing therethrough for holding said abutment in place, the pin hole for said pin being made sensibly larger than the pin to permit lateral movement thereon.

5. The combination of a cylindrical interlocking device having an annular recess located centrally thereon, and means for supporting said device for rolling movement.

6. An interlocking spacing device composed of two cylindrical bodies by which the device is supported and on which the interlock is made, said bodies being connected by a small section made integral therewith.

7. An interlocking roller having two thick cylindrical ends by which said roller is supported and on which the interlock takes place, said ends being connected by a section of reduced diameter leaving a recessed zone between said ends.

8. An interlocking roller consisting of a plain cylinder having a recessed central zone thereon, the interlock being confined to the high cylindrical portions on either side of said recess.

9. The combination of a plurality of cylindrical interlocking devices each having an annular recess located centrally thereof, and a channel for supporting said devices.

10. The combination of a series of interlocking rollers capable of direct abutment, straps passing between said rollers, and connecting interlocking wedges lying on one side of said rollers with keys located on the other side of said rollers.

11. The combination of a series of interlocking rollers capable of contacting directly with each other, wedges capable of being pulled to voted position, thereby separating said rollers, and means for guiding said wedges to the joints between the rollers.

12. The combination of interlocking rollers, each roller having two thick ends and an intermediate part of reduced diameter, said rollers being normally in direct contact with each other, with wedges adapted to be moved between the said rollers for the purpose of displacing them.

13. A plurality of interlocking rollers capable of directly contacting with each other, means for supporting said rollers, annular recesses in said rollers by which a rectangular opening is inclosed between any two consecutive ones of said rollers when in abutment.

14. A plurality of interlocking rollers supported with their axes parallel to each other, said rollers having annular recesses by which a rectangular opening is inclosed between any two consecutive ones of said rollers when in abutment.

15. A series of interlocking rollers, with means for supporting them, the two end rollers of said series being axially mounted on rigid supports, and the intermediate rollers being supported on their peripheries and having a predetermined lateral movement, limited by the collective sizes of said rollers and the position of the end rollers, each of said rollers having an annular recess so placed that an opening is inclosed between any two consecutive ones of said rollers when in abutment.

16. A series of interlocking rollers, the two end rollers of said series being axially mounted, the intermediate ones of said rollers being supported on their peripheries, means for supporting all of said rollers, said intermediate rollers being free to move except as they are restrained by said end rollers and the supporting means, each of said rollers having an annular recess so that an opening is inclosed between any two consecutive ones of said rollers when in abutment.

17. A pair of interlocking rollers supported on their peripheries and freely movable within a limited space, annular recesses in each of said rollers by which an opening is inclosed between said rollers when said rollers are in abutment.

18. A pair of interlocking spacing devices each shaped substantially as a dumbbell, said spacing devices inclosing an opening between them when said spacing devices are in abutment, and means for supporting said devices.

19. A pair of interlocking rollers, each having a movable axis, each of said rollers having an annular recess, so placed that when said pair of rollers are in abutment an opening is inclosed between them.

20. An interlocking spacing device consisting of cylindrical ends and a cylindrical portion connecting said ends, and of smaller diameter than said ends, substantially as described.

21. In a voting machine interlocking mechanism, the combination of a series of setting-keys and their connecting-bars, said bars having enlargements alternately on opposite sides thereof and being arranged in pairs, and a roller between each pair of interlocking members.

22. The combination of a series of interlocking rollers capable of direct abutment, a strap passing between said rollers and connecting an interlocking wedge lying on one side of said rollers with a key located on the other side of said rollers.

In testimony whereof, I affix my signature, in presence of two witnesses.

FRANK KEIPER.

Witnesses:
G. WILLARD RICH,
RUSSELL B. GRIFFITH.